United States Patent [19]

Su

[11] 4,162,482
[45] Jul. 24, 1979

[54] PRE-PROCESSING AND FEATURE EXTRACTION SYSTEM FOR CHARACTER RECOGNITION

[75] Inventor: Chauchang Su, West Bloomfield Township, Oakland County, Mich.

[73] Assignee: Burroughs Corporation, Detroit, Mich.

[21] Appl. No.: 858,311

[22] Filed: Dec. 7, 1977

[51] Int. Cl.² ............................................. G06K 9/12
[52] U.S. Cl. ................... 340/146.3 H; 340/146.3 AC; 340/146.3 MA
[58] Field of Search ............. 340/146.3 H, 146.3 MA, 340/146.3 AC, 146.3 AE

[56] References Cited

U.S. PATENT DOCUMENTS

| | | | |
|---|---|---|---|
| 3,196,398 | 7/1965 | Baskin | 340/146.3 H |
| 3,339,179 | 8/1967 | Shelton, Jr. et al. | 340/146.3 H |
| 3,541,511 | 11/1970 | Genchi et al. | 340/146.3 AC |
| 3,846,754 | 11/1974 | Oka et al. | 340/146.3 MA |
| 3,930,231 | 12/1975 | Henrichon, Jr. et al. | 340/146.3 MA |
| 4,003,024 | 1/1977 | Riganati et al. | 340/146.3 MA |
| 4,061,998 | 12/1977 | Ito | 340/146.3 H |

Primary Examiner—Leo H. Boudreau
Attorney, Agent, or Firm—Dale V. Gaudier; Edward J. Feeney, Jr.; Kevin R. Peterson

[57] ABSTRACT

Character recognition apparatus and a method for identifying machine-printed and hand-printed characters. A character is optically scanned and converted to a rectangular matrix representation containing black and white points. The matrixed character is pre-processed by a non-iterative line-thinning technique so as to reduce the stroke width to no more than two points along the center line of the matrixed character. Isolated black points formed in the process of thinning the strokes are removed. Any gaps in the center-line of the matrixed character are filled and the edges of all long strokes are smoothed.

The thinned character matrix is divided into a plurality of regions. One of a set of predetermined stroke features of the character matrix is extracted by scanning subregions of the character matrix such that the center position of the scanned subregions will have occupied all elements of the character matrix after one complete scan. A particular stroke feature is identified by an analysis of the arrangement of black and white points detected in each subregion. The feature extracted will be assigned to the region containing the center position of the particular subregion which was scanned.

The features extracted in each of the regions are used to identify the character. In one embodiment, the sequence of stroke features detected for regions of the character matrix is compared with a table of stroke sequences corresponding to previously identified characters. The matrix is assigned to the character whose stroke sequences most closely match that of the matrixed character. Alternatively, a weighted value may be assigned to each of the possible stroke features in each region for every possible character, based on the relative importance of that feature to the character in that region, as determined by analysis of previously identified samples of the particular hand-printed or machine-printed characters. The matrixed character is identified by summing the weighted values of the detected features assigned to each region to produce a score for each character matrix. The matrix is then assigned to the character yielding the highest score.

12 Claims, 23 Drawing Figures

FIG. 12A
SCANNED CHARACTER

FIG. 12B
MATRIXED CHARACTER

FIG. 12C
THINNED CHARACTER

FIG. 12D
NOISE REMOVAL

FIG. 12E
GAPS FILLED IN

FIG. 12F
EDGES SMOOTHED

FIG. 12G FEATURE EXTRACTION AREAS

PRE-PROCESSING AND FEATURE EXTRACTION SYSTEM FOR CHARACTER RECOGNITION

FIELD OF THE INVENTION

The invention relates to the field of machine recognition of hand-printed or machine-printed characters. More particularly, the invention relates to a method and associated apparatus for processing a character after it has been converted to a matrix of black and white points which includes means for pre-processing and extraction of geometrical features from the matrixed character.

DESCRIPTION OF THE PRIOR ART

Character recognition devices and methods have become increasingly popular for use in the areas of mail sorting, bank code identification, and direct encoding of hand-printed or machine-printed characters for data processing purposes.

Generally, a character to be identified must be first converted into some type of machine readable form. One such technique for converting the character into machine-readable form is where the character is optically scanned and then converted into a matrix of black and white points, such as is disclosed in U.S. Pat. No. 3,541,511. It also has been recognized that after the initial scanning of the character, a certain amount of pre-processing of the matrixed character simplifies later steps and helps to achieve more accurate results in character recognition. One such useful pre-processing technique is line-thinning, wherein the broad strokes of the scanned character are reduced to a skeletal representation of the character, usually one or two points wide, while still retaining the basic geometrical information of the original. Several such line-thinning techniques are shown in U.S. Pat. Nos. 3,541,511, 3,339,179 and 3,609,685. However, these methods all suffer from the disadvantages of requiring multiple passes or iterations of the matrixed character and a large amount of processing circuitry in order to produce a skeletal representation of the scanned character which still contains all relevant positional and geometrical information. Such problems and a suggested solution are discussed at length in "Recognition of Handwritten Numerical Characters For Automatic Letter Sorting", Hiroshi Genchi et al, *Proceeding of the IEEE*, Vol. 56, No. 8, August 1968, pages 1292–1301.

Further, it has been recognized that especially for hand-printed characters the relevant geometrical features which uniquely identify the character may be distorted, compressed, or incomplete due to differences in handwriting and the quality of the writing instrument. Therefore, in order to extract as much useful information from the matrixed character as possible, it has been proposed to subdivide the overall geometry of the scanned character into various standard stroke segments. These segments may be horizontal, vertical, or diagonal lines, or more complex figures such as loops, bends, or a point segment combination (e.g. a comma). Techniques for feature extraction which use these types of stroke segment geometries are illustrated in U.S. Pat. Nos. 3,541,511, 3,522,586, and 3,613,080. However, these prior art techniques require multiple scans and iterations of the matrixed character or the use of special feature masks before the more complex geometrical features of the characters, especially those which are hand-printed, may be extracted.

SUMMARY OF THE INVENTION

It is therefore an object of this invention to provide an improved character recognition system.

It is a further object to provide a character recognition system having improved means for pre-processing a character which has been scanned and converted into a matrix representation of black and white points.

It is still another object to provide apparatus for pre-processing of a matrixed character which includes means for line-thinning, noise removal, discontinuity reduction, and edge smoothing.

It is yet a further object to provide a character recognition system having improved means for extracting a set of geometrical features from a thinned character matrix.

It is an additional object to provide an improved method for machine recognition of hand-printed or machine-printed characters.

It is still a further object to provide a method for recognizing characters wherein pre-processing steps are performed on a matrixed character.

It is a still further object to provide an improved method for pre-processing of a matrixed character which includes the steps of line-thinning, noise removal, discontinuity reduction, and edge smoothing.

It is yet an additional object of provide an improved method for extracting geometrical features from a thinned character matrix.

These and other objects of the invention are achieved by providing a character recognition system in which the character to be identified is first optically scanned and converted into a matrix representation of black and white points. Pre-processing is accomplished by the use of a non-iterative line-thinning technique which generates a skeletal character matrix from the matrixed character by first detecting the center-line of the matrixed character and then eliminating all points not contiguous with the center line. Further processing of the skeletal character matrix may be accomplished by removing isolated points in the skeletal character matrix, filling in discontinuities in the center line and removing spurious points adjacent to the center-line (edge smoothing).

The geometrical features necessary for character recognition are extracted from the skeletal character matrix by dividing the skeletal character matrix into a plurality of regions, detecting a pattern of black and white points in each of the regions and comparing these detected patterns with a set of geometrical features corresponding to these patterns, each of these features having a unique coded value.

The character is then identified by comparing each of the features detected in each of the regions of the skeletal character matrix with a table of stroke sequences corresponding to characters previously identified, and assigning the known character to the matrixed character whose stroke sequence most closely match that of the matrixed character.

BRIEF DESCRIPTION OF THE DRAWINGS

The invention is herein described, by way of example only, with reference to the accompanying drawings, wherein.

DESCRIPTION OF THE PREFERRED EMBODIMENT

Overall Arrangement of the System

Figure 1:
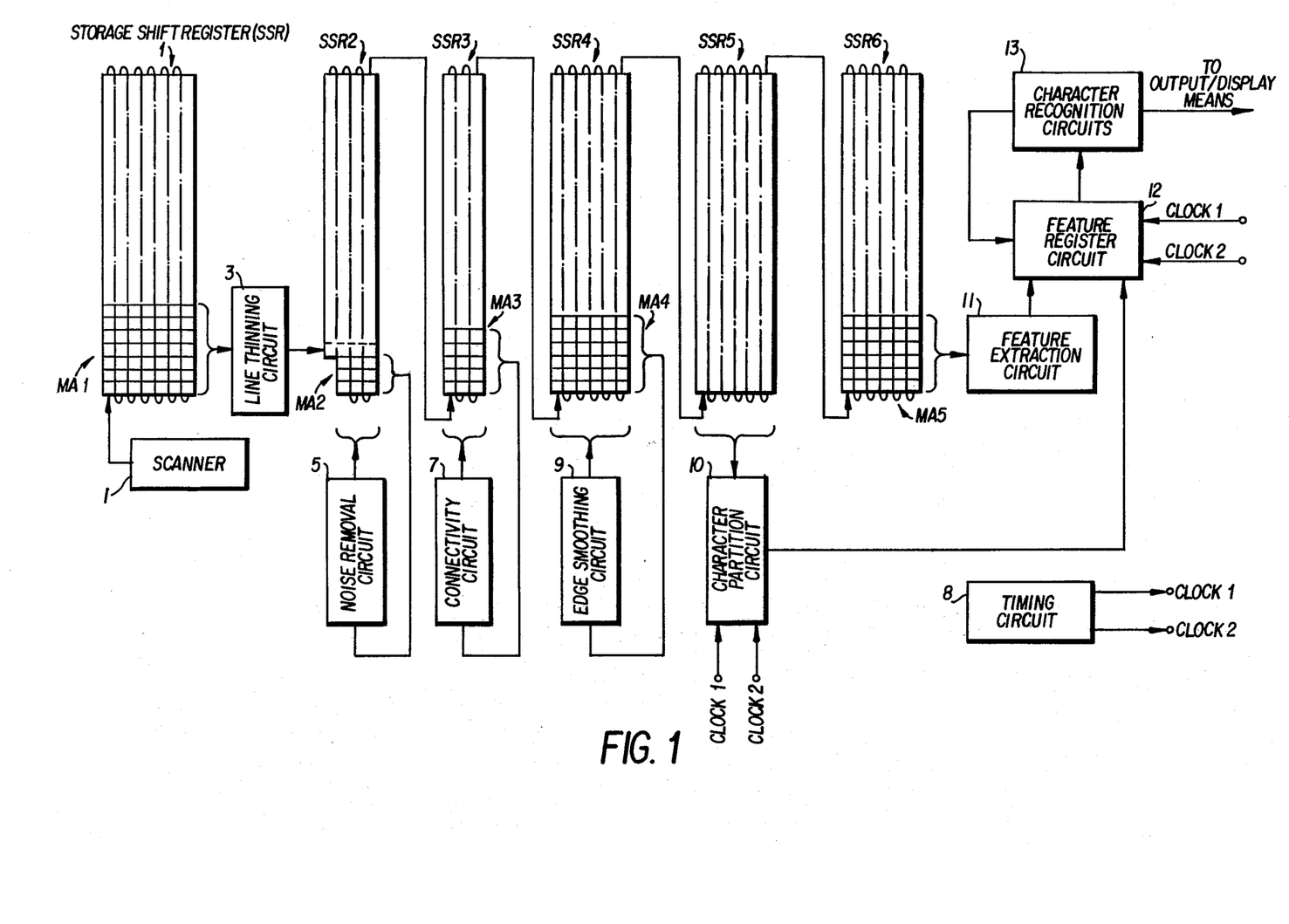
FIG. 1 is a block diagram showing the various stages of the character pre-processing system as used in the invention.
Figure 12A:
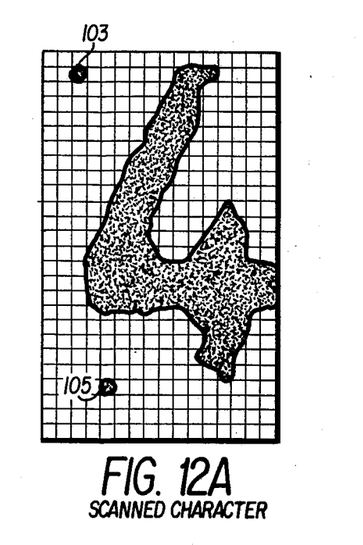
FIGS. 12a–12g illustrate the typical transformations caused by the pre-processing operations of the present invention, as performed on the numeral 4.

With reference to FIG. 1 of the drawings, there is shown a block diagram of the pre-processing system of the present invention. Scanner 1 is used to optically scan a hand-printed or machine-printed alphanumeric character, such as shown in FIG. 12a. The output of scanner 1 is applied to storage shift register (SSR) 1. A 7×7 array of the contents of SSR1, designated as MA1, is then applied to the non-iterative line thinning circuit 3. The output of line thinning circuit 3 is then applied to SSR2. A 3×3 array of the contents of SSR2, denoted as MA2, is applied to the noise removal circuit 5. The output of noise removal circuit 5 is reintroduced into SSR2. The output of SSR2 is then applied to SSR3. A 3×5 array of the contents of SSR3, designated as MA3, is applied to the connectivity (gap-filling) circuit 7. The output of connectivity circuit 7 is reintroduced into SSR3. The output of SSR3 is applied to the input of SSR4. A 6×6 array of the contents of SSR4, denoted as MA4, is applied to the edge smoothing circuit 9. The output of edge smoothing circuit 9 is reapplied to the SSR4. The output of SSR4 is then applied to the input of SSR5. SSR5 should be large enough to contain the complete matrix of a character. The output of SSR5 is applied to partition circuit 10 which determines the character boundaries and defines the subdivision of the character matrix. The output of partition circuit 10 is applied to the input of feature register circuit 12. The output of SSR5 is also applied to the input of SSR6. An array of the contents of SSR6, denoted as MA5, is applied to feature extraction circuit 11. The output of feature extraction circuit 11 is then applied to feature register circuit 12. Feature register 12 is coupled to character recognition circuit 13. Circuit 13 acts to generate a visual or electronic indication of the character originally scanned for use by the operator or various types of data processing equipment.

Detailed Description of the System

With reference to FIG. 1 of the drawings, it can be seen that the initial input into the pre-processing system of the invention is achieved through the use of scanner 1. Scanner 1 is preferably of the sensor array type well known in the art. Scanner 1 acts to optically scan a plurality of picture areas or elements ("pixels") of an alphanumeric character, such as shown in FIG. 12a, and convert the scanned character into a series of electrical pulses representing light and dark areas of the original character. For convenience, a detected light or "white" area is designated as a logical "0" while a detected dark or "black" area is designated as a logical "1". Preferably, scanner 1 is chosen so as to have a resolution of at least three pixels across the stroke width of the finest or smallest of machine or hand printed characters expected to be encountered.

As the various black and white elements are detected by scanner 1, they are stored serially in SSR1. SSR1 is of a type known in the art and may be comprised of any of a number of suitable devices, for example, charge-coupled storage devices, the only requirement being that SSR1 be of sufficient storage capacity so as to be able to contain all the black and white elements detected from seven complete vertical scans of a character. A pulse from a clock source or timing circuit 8 will cause the stored elements to be advanced one space for each such clock pulse. Timing circuit 8 may be one of a variety of well-known clocking circuits which are used with storage shift register devices. It should be noted that the other storage shift registers, SSR2, SSR3, SSR4, SSR5, and SSR6 would be similar in construction and operation to that of SSR1. Though in FIG. 1 the storage shift registers SSR1, SSR2, SSR3, SSR4, SSR5, and SSR6 are shown as being separate from each other, in fact, in the preferred embodiment storage shift registers SSR1, SSR2, SSR3, SSR4, SSR5, and SSR6 are all part of a much larger storage shift register array.

Figures 2, 2A, 10:
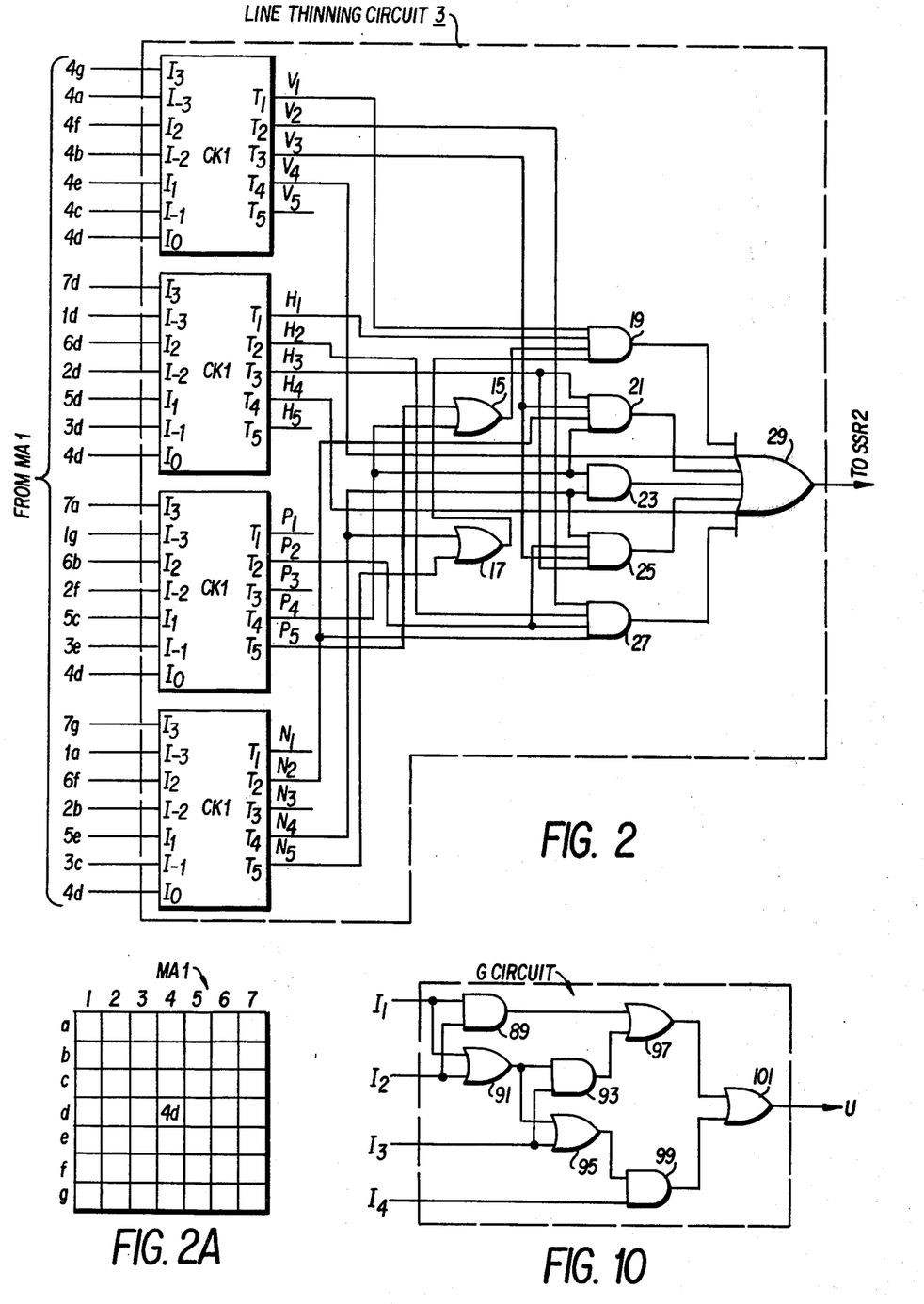
FIG. 2 is a diagram of the line-thinning circuit shown in FIG. 1.
FIG. 2a shows in more detail the 7×7 matrix, MA1, which is used with the line-thinning circuit of FIG. 2.
FIG. 10 is a more detailed diagram of circuits $G_1$–$G_9$ shown in FIG. 9.

A 7×7 element array or matrix of SSR1, designated as MA1 in FIG. 1 and shown in more detail in FIG. 2a, is used in conjunction with the non-iterative line thinning circuit 3, shown more particularly in FIG. 2.

The line thinning circuit 3, shown in FIG. 2, is used to normalize the stroke width of the matrixed character stored in SSR1. Reduction of the stroke width, or line thinning, is desirable since it will reduce the hardware and logical complexities of the recognition circuitry and also increase the overall reliability of the system. Basically the line thinning circuit 3 acts to select only those black elements (logical "1") which are on or near to the center line of strokes while all other black elements are set to white (logical "0").

Region MA1 of SSR1 is treated sequentially by the line thinning circuit 3. A second scratch matrix in SSR2 is provided and is initially cleared, i.e. each element in the scratch matrix is set to white (logical "0").

As SSR1 clocks its various stored black and white elements through the 7×7 matrix MA1, the line thinning circuit 3 will perform a particular Boolean analysis of the arrangement of black and white elements in MA1 and determine whether the center element 4d of MA1, shown in FIG. 2a, is a point on the center line of a stroke. If 4d is a white element, then it cannot be such a point, even though the corresponding point of the original printed character could have been a point on the center line of a stroke, but due to noises in printing, handling, or scanning the character, it was entered as a white element in the matrix. In this case, a new region would be selected until 4d is black. The line thinning circuit 3 is then used to decide whether element 4d is a point on a stroke center line. If it is indeed such a point, line thinning circuit 3 will cause the corresponding point to be set to black and be entered into SSR2.

Line thinning circuit 3 performs this center-line detection function through a Boolean analysis of the black and white elements contained in the 7×7 region of MA1 surrounding element 4d. The line-thinning circuit shown in FIG. 2 has a number of identical sub-circuits, labeled CK1, which are shown in more detail in FIG. 3. Circuit CK1 is comprised of three identical blocks of logic elements, each comprised of NAND gates 31, 33, 35, 37, 39, and 41, and OR gates 43 and 45. CK1 has a total of seven input lines labeled $I_0$, $I_1$, $I_{-1}$, $I_2$, $I_{-2}$, $I_3$, $I_{-3}$, and five output lines labeled $T_1$, $T_2$, $T_3$, $T_4$, $T_5$. The inputs of the four CK1 circuits shown in FIG. 2 come from the designated rank and file areas of MA1 as labeled in FIG. 2a. The output of the four circuits CK1 are fed into a logic network comprised of OR gates 15 and 17, AND gates 19, 21, 23, 25, and 27, and OR gate 29. The output of OR gate 29 is applied to the input of SSR2.

Figure 3:
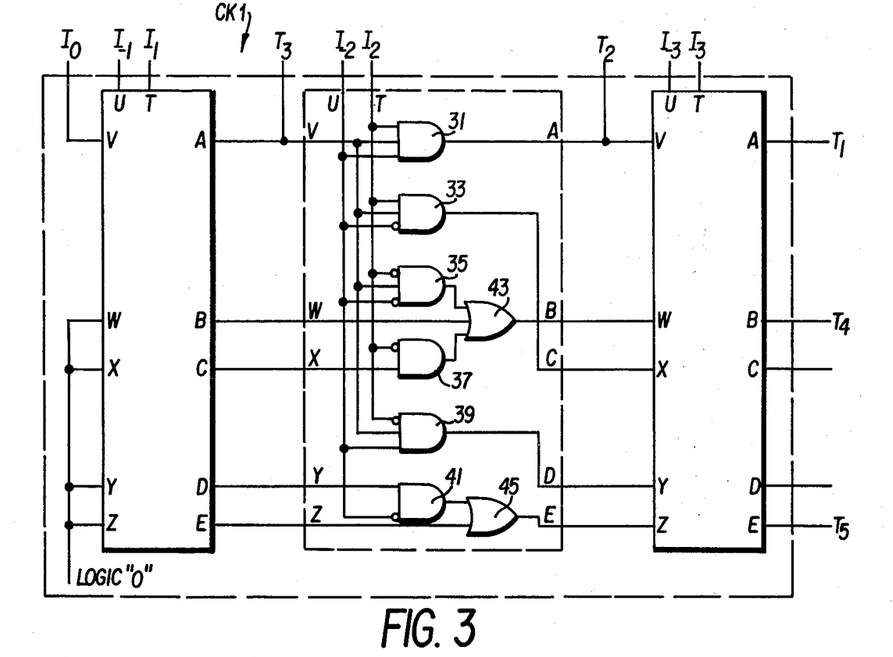
FIG. 3 is a more detailed diagram of circuits CK1 shown in FIG. 2.

The operation and function of the line thinning circuit 3 and the four logic circuits CK1 will be more readily apparent from a study of the particular Boolean analysis of MA1 used to accomplish line thinning, of which line thinning circuit 3 is a hard-wired example.

The following logical steps are taken in order to accomplish non-iterative line thinning:

A. let the binary vector V be $$V = (4a, 4b, 4c, 4d, 4e, 4f, 4g)$$

Set the binary variables $v_i$, i = 1, 2, 3, 4 as follows:

| (a) | $v_1 = 1$ if V = | (1, 1, 1, 1, 1, 1, 1) |
|---|---|---|
| (b) | $v_2 = 1$ if V = | (■, 1, 1, 1, 1, 1, ■) |
| (c) | $v_3 = 1$ if V = | (■, ■, 1, 1, 1, ■, ■) |
| (d) | $v_4 = 1$ if V = | (0, 1, 1, 1, 1, 1, 0) |
| | | (■, 0, 1, 1, 1, 1, 0) |
| | | (■, 0, 1, 1, 1, 0, ■) |
| | | (■, ■, 0, 1, 1, 0, ■) |
| | | (■, ■, 0, 1, 0, ■, ■) |

Where ■ stands for either 1 or 0.

B. Let the binary vector H be $$H = (7d, 6d, 5d, 4d, 3d, 2d, 1d)$$

Set the binary binary variables $h_i$, i = 1, 2, 3, 4 as follows:

| (a) | $h_1 = 1$ if H = | (1, 1, 1, 1, 1, 1, 1) |
|---|---|---|
| (b) | $h_2 = 1$ if H = | (■, 1, 1, 1, 1, 1, ■) |
| (c) | $h_3 = 1$ if H = | (■, ■, 1, 1, 1, ■, ■) |
| (d) | $h_4 = 1$ if V = | (0, 1, 1, 1, 1, 1, 0) |
| | | (■, 0, 1, 1, 1, 1, 0) |
| | | (■, 0, 1, 1, 1, 0, ■) |
| | | (■, ■, 0, 1, 1, 0, ■) |
| | | (■, ■, 0, 1, 0, ■, ■) |

C. Let the binary vector P be $$P = (7a, 6b, 5c, 4d, 3e, 2f, 1g)$$

Set the binary variables $P_i$, i = 2, 4, 5 as follows:

| (a) | $p_2 = 1$ if P = | (■, 1, 1, 1, 1, 1, ■) |
|---|---|---|
| (b) | $p_4 = 1$ if P = | (0, 1, 1, 1, 1, 1, 0) |
| | | (■, 0, 1, 1, 1, 1, 0) |
| | | (■, 0, 1, 1, 1, 0, ■) |
| | | (■, ■, 0, 1, 1, 0, ■) |
| | | (■, ■, 0, 1, 0, , ■) |
| (c) | $p_5 = 1$ if P = | (0, 1, 1, 1, 1, 0, ■) |
| | | (■, 0, 1, 1, 0, ■, ■) |

D. Let the binary vector N be $$N = (7g, 6f, 5e, 4d, 3c, 2b, 1a)$$

Set the binary variables $n_i$, i = 2, 4, 5 as follows:

| (a) | $n_2 = 1$ if N = | (■, 1, 1, 1, 1, 1, ■) |
|---|---|---|
| (b) | $n_4 = 1$ if N = | (0, 1, 1, 1, 1, 1, 0) |
| | | (■, 0, 1, 1, 1, 1, 0) |
| | | (■, 0, 1, 1, 1, 0, ■) |
| | | (■, ■, 0, 1, 1, 0, ■) |
| | | (■, ■, 0, 1, 0, ■, ■) |
| (c) | $n_5 = 1$ if N = | (0, 1, 1, 1, 1, 0, ■) |
| | | (■, 0, 1, 1, 0, 0, ■) |

Then the element entered into SSR2 is marked black (logical "1"), if the following Boolean equation is satisfied:

$$4d = 1 = v_4 + h_4 + p_4 \cdot n_4 + v_3 \cdot h_3(p_4 \cdot n_2 + p_2 \cdot n_4) + \quad [\text{Eq. 1}]$$
$$v_2 \cdot h_2 \cdot p_2 \cdot n_2 + v_1 \cdot h_1(p_4 + p_5)(n_4 + n_5)$$

Otherwise, a white element (logical "0") is entered. The 7×7 regions of MA1 are selected and processed one at a time as the contents of SSR1 are circulated through MA1 in response to clocking pulses. Thus, each element of the scanned character matrix will occupy the center portion 4d of MA1 at least once.

Figure 12B:
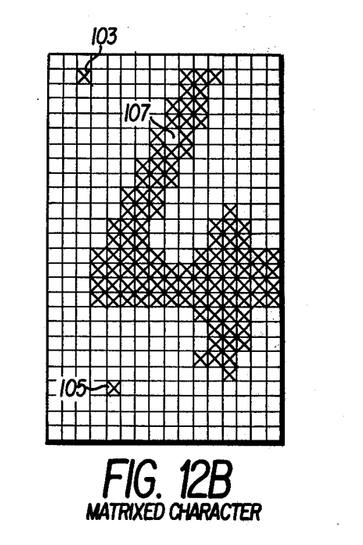
Figure 12C:
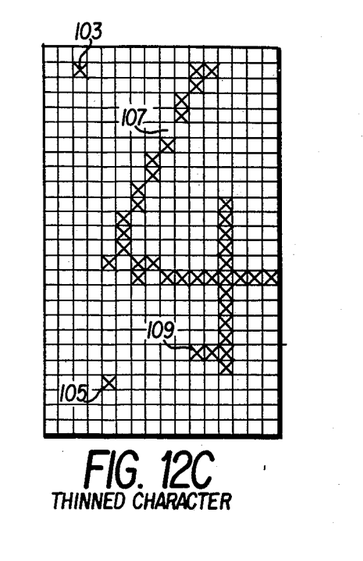

With reference to FIG. 12a, there is shown an example of a hand-printed character, here the numeral 4, as it would appear to the optical scanner 1. FIG. 12b shows how the character would appear in SSR1 after being converted to a series of black and white points. Here "X" represents a black point and a blank space indicates a white point. It will be noted that two dark spots 103 and 105 have been detected and entered into the matrix, and that point 107 has failed to be detected and blackened properly. At this point it can be seen that the average stroke width of the matrixed character shown in FIG. 12b is three elements. By using the non-iterative line thinning technique, as embodied in line thinning circuit 3 described above, the resultant matrix in SSR2 will be blackened as shown in FIG. 12c. The stroke width has now been normalized along the centerline of the character, resulting in a "skeletal" representation of the character as shown in FIG. 12c.

Due to imperfections in scanning, electrical noise in the system, or imperfections in the printed character itself, isolated points, such as those denoted as 103 and 105 will be formed during the process of line thinning, and an occasional point on the centerline, such as 107 will be omitted. It is then desirable to remove these isolated black points. Isolated points in the thinned character matrix, such as 103 and 105, have a much greater influence on later character recognition than they do before thinning because the total number of black points in the thinned matrix is greatly reduced. As will be described below it is also necessary to fill in small gaps, such as 107 shown in FIG. 12c, created because of missing elements in the center line. If isolated points are allowed to remain in the thinned character matrix, their effect will be compounded through the filling in of gaps (connectivity function). Hence, removal of isolated black points before gap filling is done will help increase the reliability of the character recognition system.

Figure 4:
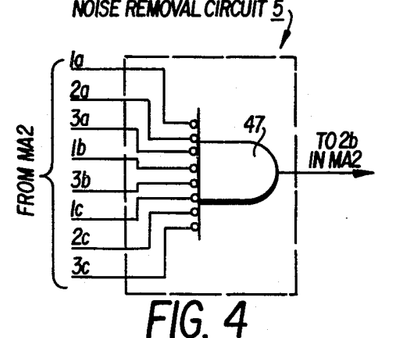
FIG. 4 is a diagram of the noise removal circuit shown in FIG. 1.
Figure 4A:
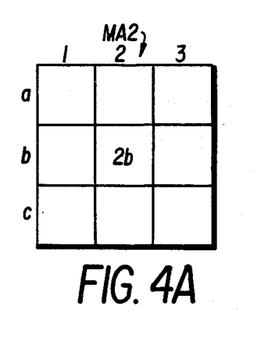
FIG. 4a shows in more detail the 3×3 matrix, MA2, which is used with the noise removal circuit of FIG. 4.

A 3×3 element array or matrix of SSR2, designated as MA2 in FIG. 1 and shown in more detail in FIG. 4a, is used in conjunction with the noise removal circuit 5, shown more particularly in FIG. 4. As the thinned character matrix present in SSR2 is clocked through the region of MA2, the logical network of noise removal circuit 5 acts to inspect the eight surrounding elements of the center element 2b of 3×3 elemental area or matrix MA2. Noise removal circuit 5 is comprised of an AND gate 47 having eight inverting inputs. The inputs come from the eight correspondingly labeled rank and file elements of MA2 which surround element 2b. The output of AND gate 47 is applied to the center element 2b of matrix MA2. The eight input AND gate 47 performs the following logical function: if and only if all eight inputs to circuit 5 are "0" (i.e. all eight elements surrounding element 2b are white) then the output of AND gate 47 will be a "0", causing element 2b of MA2 to be set to white. Each element of the thinned character matrix circulating through SSR2 will pass through element 2b of MA2. Hence a black point present in element 2b of MA2 will be set to white if its surrounding eight neighboring elements contain white points.

After all elements of the thinned character matrix have been processed to remove isolated points the resulting series of black and white points are introduced into SSR3. A 3×5 array of the contents of SSR3, designated as MA3 in FIG. 1 and shown in more detail in FIG. 5a, is used in conjunction with the connectivity circuit 7, shown more particularly in FIG. 5.

Figures 5, 5A:
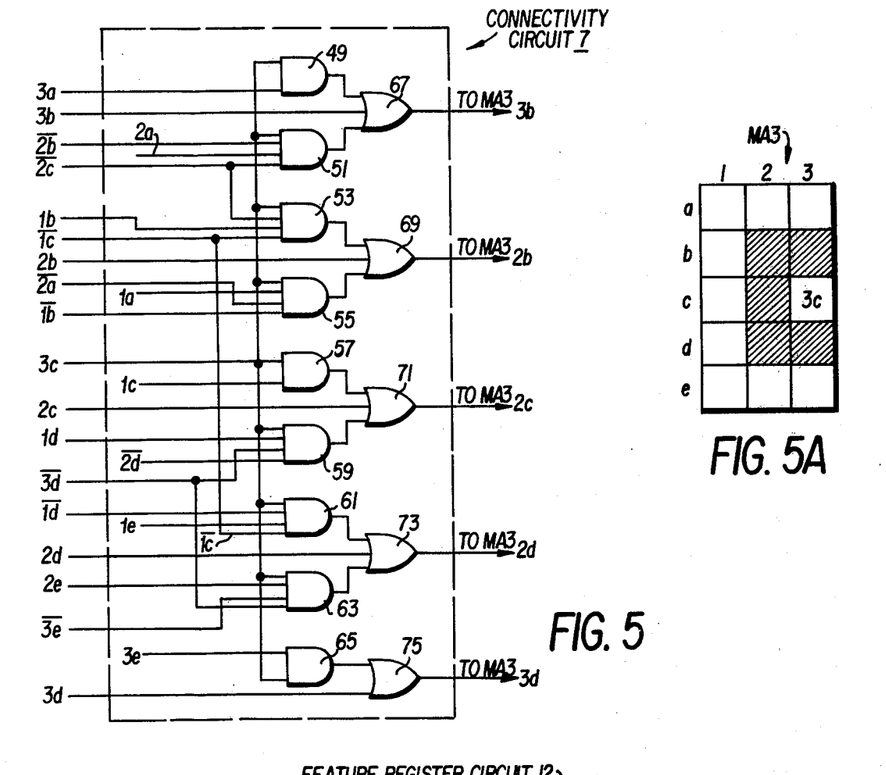
FIG. 5 is a diagram of the connectivity circuit shown in FIG. 1.
FIG. 5a shows in more detail the 3×5 matrix, MA3, which is used with the connectivity circuit of FIG. 5.

The connectivity circuit 7, shown in FIG. 5, is used to fill in any gaps appearing in the thinned skeletal representation of the scanned character. Despite the high degree of accuracy afforded by the line thinning technique and apparatus described above, gaps may appear in the center line. Of course, more terms could be added to Eq. 1 ($4d=1$), described above, so that every point on the center line would be included. However, this action would also unnecessarily increase the points off the center line which would be selected during the step of line thinning and would tend to jeopardize the very purpose of thinning. However, with the particular non-iterative line thinning process used in the present invention most points off the center line will not be selected and, in the great majority of cases, the gap between parts of a broken center line is only one element. Thus, by filling in gaps of one element, center line continuity may be restored.

The connectivity function is provided by the connectivity circuit 7 shown in FIG. 5, comprised of a logical network of AND gates 49, 51, 53, 55, 57, 59, 61, 63, and 65, and OR gates 67, 69, 71, 73, and 75. The labeled input and output lines of connectivity circuit 7 correspond to the rank and file elements of the 3×5 array, MA3, shown in FIG. 5a.

As the black and white elements corresponding to the thinned character matrix are circulated through MA3, a gap in the center line will be detected and set to black using the following Boolean logical analysis, of which connectivity circuit 7 is a hard-wired implementation:

With respect to the 3×5 array of elements MA3, points 3b, 2b, 2c, 2d, and 3d shown as a darkened zone in FIG. 5a will be set to black (logical "1") disregarding their original status as follows:

$3b=1$ if $(3a+2a\cdot\overline{2b}\cdot\overline{2c})\cdot 3c=1$    (a)

$2b=1$ if $(1b\cdot\overline{1c}\cdot\overline{2c}+\overline{2a}\cdot\overline{1b}\cdot 1a)\cdot 3c=1$    (b)

$2c=1$ if $(1c+1d\cdot\overline{3d}\cdot\overline{2d})\cdot 3c=1$    (c)

$2d=1$ if $(1e\cdot\overline{1d}\cdot\overline{1c}+2e\cdot\overline{3d}\cdot\overline{3e})\cdot 3c=1$    (d)

$3d=1$ if $3e\cdot 3c=1$    (e)

Figure 12D:
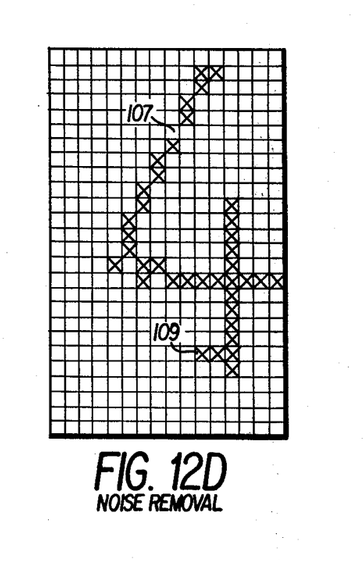
Figure 12E:
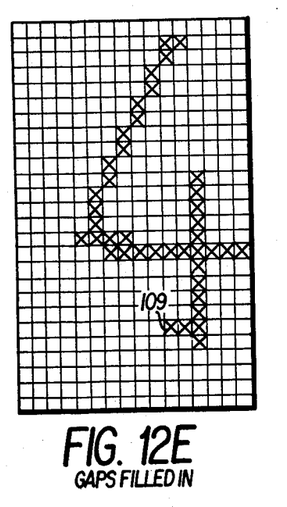

Each element of the thinned character matrix circulating through SSR3 will pass through element 3c of MA3 which will cause any gaps in the thinned matrix center line detected by connectivity circuit 7 to be blackened. A comparison of FIG. 12e with FIG. 12d will show that after the thinned matrix of FIG. 12d has been processed through connectivity circuit 7, a gap along the centerline labeled 107 has been filled in as shown in FIG. 12e. After the elements of the thinned character matrix have passed through connectivity circuit 7 they are recirculated through SSR3 and eventually are then circulated through SSR4.

Figure 6:
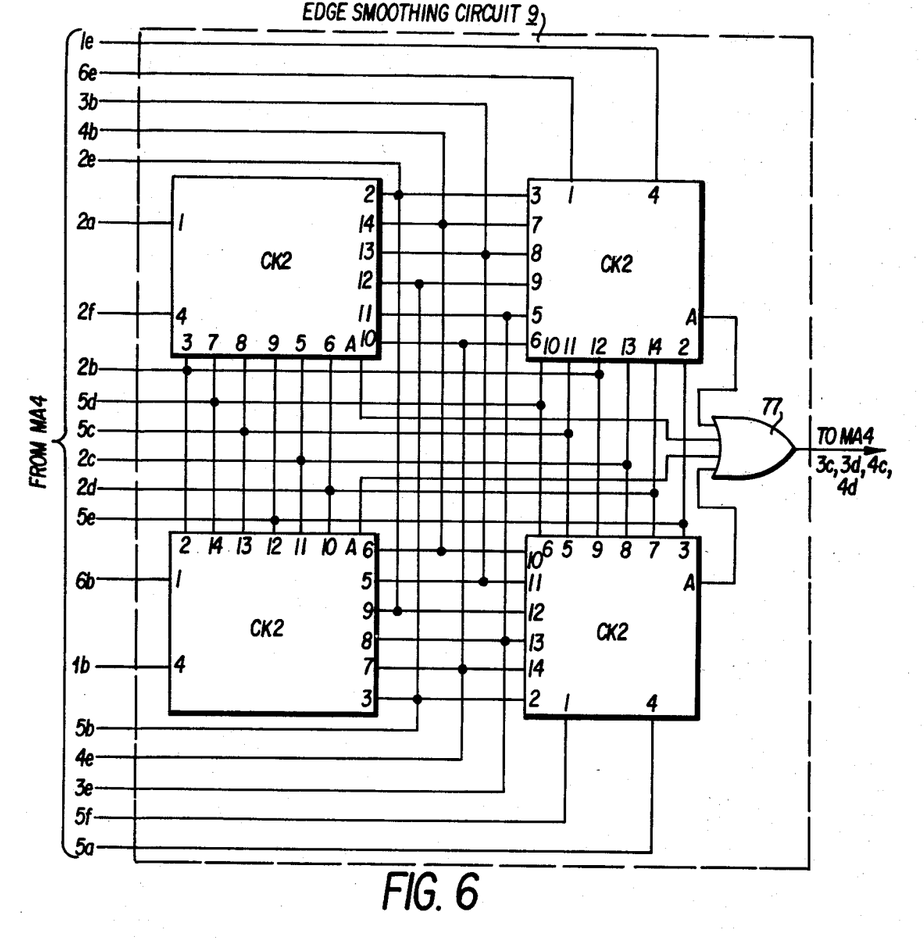
FIG. 6 is a diagram of the edge smoothing circuit shown in FIG. 1.
Figure 6A:
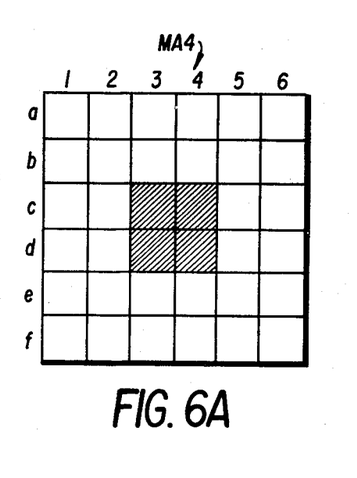
FIG. 6a shows in more detail the 6×6 matrix, MA4, which is used with the edge smoothing circuit of FIG. 6.

The final step to be performed in the pre-processing of the thinned character is edge smoothing. A 6×6 element array or matrix of SSR4, labeled as MA4 in FIG. 1 and shown in more detail in FIG. 6a, is used in conjunction with the edge smoothing circuit 9, shown more particularly in FIG. 6. Due to stroke irregularities, short stems are often created at right angles to a long stroke of the center line. An example of such stems is shown at 109 in FIGS. 12c, 12d, and 12e. If such stems are allowed to remain in the thinned character matrix, an improper feature may be obtained by the feature extraction circuit described below. Hence, it is desirable to remove short stems along a long stroke.

Stem removal is most readily accomplished by inspecting a 2×2 element central section of MA4 adjacent to a long stroke (defined to be at least 1×4 elements) and setting the 2×2 area to white (logical "0") if that 2×2 area is bounded by white elements along three sides.

Figure 7:
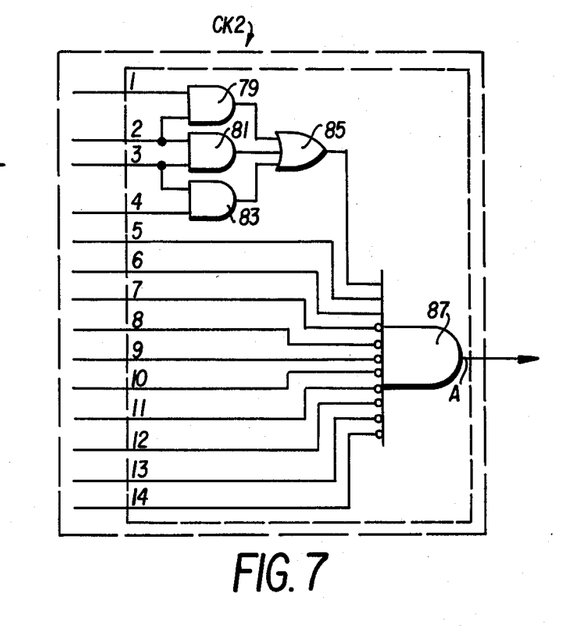
FIG. 7 is a more detailed diagram of circuits CK2 shown in FIG. 6.
Figure 8:
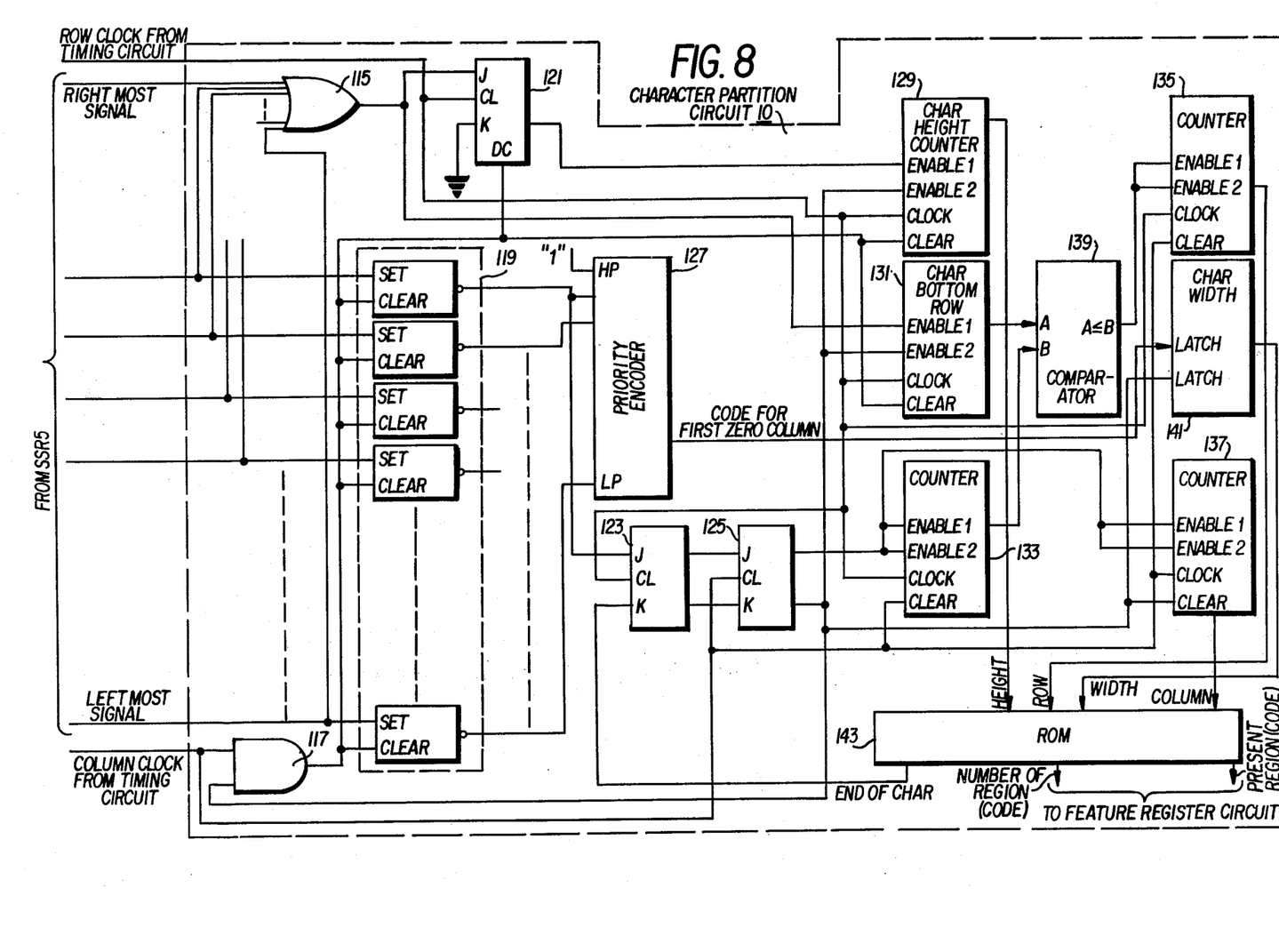
FIG. 8 is a diagram of the character partition circuit shown in FIG. 1.

Edge smoothing circuit 9 is a hard-wired implementation of the above-mentioned stroke removal technique. Edge smoothing circuit 9 is comprised of a plurality of input lines, corresponding to the appropriate rank and file elements of MA4 as labeled in FIG. 6a, which are connected to four identical logic circuits CK2, as shown in FIG. 6. Each of the four circuits CK2 has an output line which is connected to OR gate 77. The logic "1" output of OR gate 77 causes the indicated elements, 3c, 3d, 4c, and 4d of MA4, to be set to white. FIG. 7 shows in more detail one of the four identical logic circuits CK2. Circuit CK2 is comprised of three AND gates 79, 81, 83, OR gate 85, and output AND gate 87.

Edge smoothing circuit 9 acts to sample various 1×4 element areas adjacent to the central 2×2 areas, 3c, 3d, 4c, and 4d MA4. If the 2×2 area contains one or more black elements and is adjacent to a long stroke (at least 1×4 elements) then the black element will be reset to white by edge smoothing circuit 9.

Figure 12F:
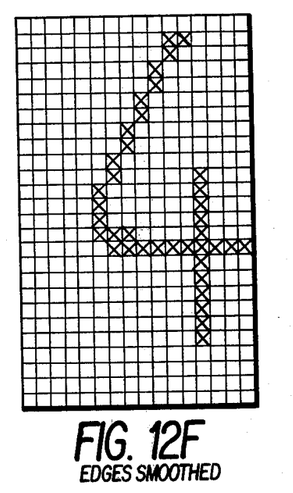

Each element of the thinned character matrix circulating through SSR4 will pass through the 2×2 element array, 3c, 3d, 4c, and 4d of MA4 thus causing any stems to be removed (set to white). A comparison of FIG. 12f with FIG. 12e will show that after the thinned matrix of FIG. 12e has been processed through edge smoothing circuit 7, a stem along the center line labeled 109 has been removed as shown in FIG. 12f.

After the elements of the thinned character matrix have passed through edge smoothing circuit 9 they are recirculated through SSR4 and eventually are applied to SSR5.

Once the step of pre-processing of the character has been completed the steps of character partition, feature extraction and character identification may be undertaken.

The character partition circuit 10 receives its inputs from the correspondingly labeled columns of SSR5. Also shown are two clocked inputs from timing circuit 8, one for the column clock and the other for the row clock. Circuit 10 comprises a number of gates 115, 117, and 119, JK flip-flops 121, 123, and 125, priority encoder 127, counters 129, 131, 133, 135, and 137, comparator 139, latch 141, and Read Only Memory 143. The output of character partition circuit 10 is fed into the input of feature register circuit 12, shown in more detail in FIG. 11. Character partition circuit 10 acts to subdivide a character into a plurality of character regions or subregions in order to extract a relevant geometrical stroke feature from each such character region. The size and number of these character regions are preferably determined in proportion to to the character size. The number of these character regions may optionally be a number predetermined independently of the character size. Each such character region must be large enough so that significant line features may be detected, yet small enough so that there are sufficient numbers of regions within the extent of the character. In the preferred embodiment, a minimum of twelve character regions, three horizontally and four vertically, were found to be necessary. Such character regions are denoted as 113 in FIG. 12g.

Figure 9:
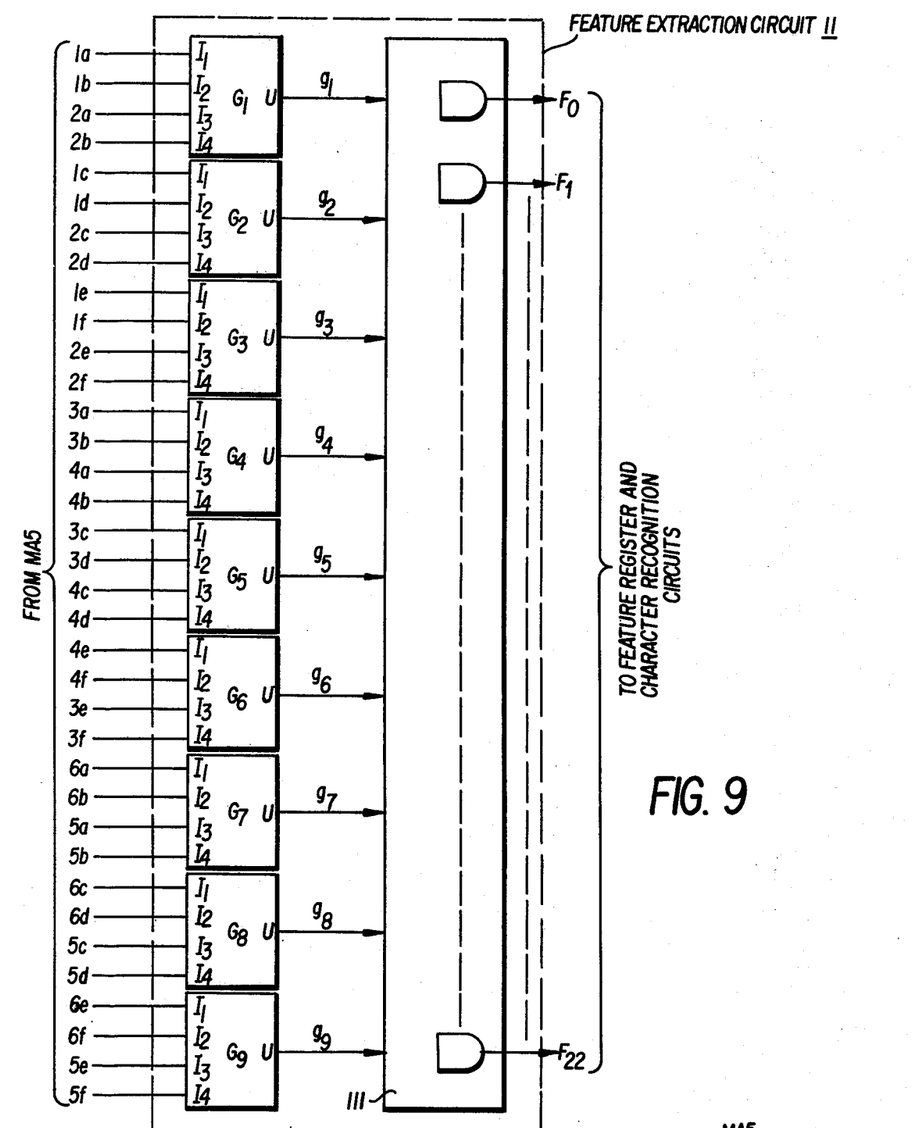
FIG. 9 is a diagram of the feature extraction circuit shown in FIG. 1.
Figure 9A:
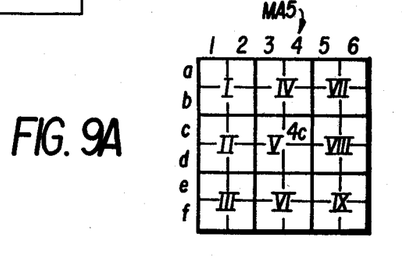
FIG. 9a shows in more detail how the 6×6 matrix, MA5, is divided into nine subregions for use with the feature extraction circuit of FIG. 8.
Figure 12G:
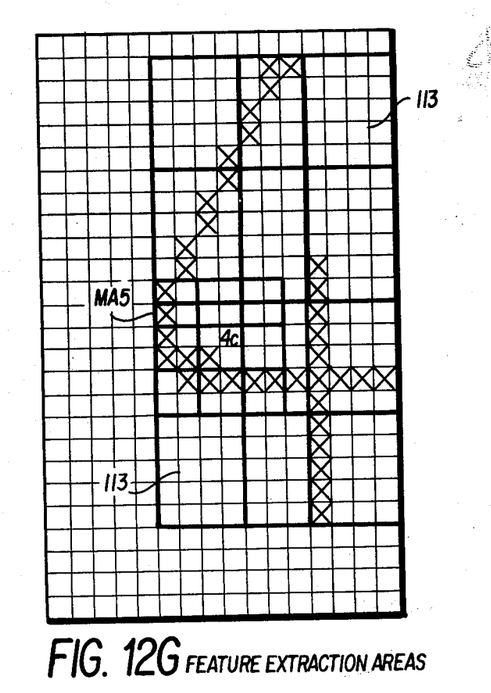

After character partitioning the character elements circulating in SSR5 will be applied to the input of SSR6. At this point feature extraction may begin. A 6×6 element array or matrix of SSR6 labeled as MA5 in FIG. 1 and shown in more detail in FIG. 9a, is used in conjunction with the feature extraction circuit 11 shown in more detail in FIG. 9. Feature extraction circuit 11 acts to take a partitioned input from MA5 and produce one or more outputs along lines $F_0, F_1 \ldots F_{22}$, corresponding to detected stroke features found in the partitioned character matrix. For example, the matrix for the figure "4" shown in FIG. 12g is partitioned into twelve 3×5, 4×5, 3×6, and 4×6 regions; one 6×6 basic area, labeled MA5, is defined in the same matrix with heavy lines. It will be noted that basic area MA5 overlaps with four of the character regions 113, as shown in FIG. 12g. Any feature extracted from basic area MA5 will be assigned to the character region to which the element 4c of basic area MA5 belongs. The feature extraction process terminates only when every element of the character matrix stored in SSR6 has occupied the element 4c of MA5 at least once.

With reference to FIG. 9a, it can be seen that 6×6 basic area MA5 is subdivided into nine blocks or subregions, I, II, ..., IX, each such block being comprised of a 2×2 array of elements. Feature extraction circuit 11, shown in FIG. 9, performs the function of stroke detection and feature extraction through a Boolean analysis of the black and white elements contained in the 6×6 region of MA5 surrounding element 4c. The feature extraction circuit shown in FIG. 9 has a number of identical sub-circuits, labeled $G_1, G_2, \ldots, G_9$ which are shown in more detail in FIG. 10. Circuit G is comprised of AND gates 89, 93, 99 and OR gates 91, 95, 97, and output OR gate 101. The G circuit has four input lines, labeled $I_1, I_2, I_3$ and $I_4$, and the inputs of the nine G circuits shown in FIG. 9 come from the designated rank and file elements of MA5 as labeled in FIG. 9a. The output lines U of the nine G circuits are fed into logic circuit 111, having a number of AND gates with outputs along lines $F_0, F_1, F_2 \ldots, F_2$.

The operation of feature extraction circuit 11 and the nine G circuits will be more readily apparent from the following description:

Let $G_1, G_2 \ldots, G_9$ be the number of black points in blocks I, II, III, ..., IX, respectively.

Set $g_i = 1$ if $G_i \leq 2$ for $i = 1, 2, 3, \ldots, 9$; otherwise $g_i = 0$.

Let $A = (g_1, g_2 \ldots, g_9)$. Set the features $F_0$ through $F_{22}$ as shown in the following table:

Table 1

| If A equals | | | | | | | | | Set Features | |
|---|---|---|---|---|---|---|---|---|---|---|
| g1 | g2 | g3 | g4 | g5 | g6 | g7 | g8 | g9 | F | Representing |
| 0 | 0 | 0 | 0 | 0 | 0 | 0 | 0 | 0 | ...F0 | (BLANK) |
| 0 | 0 | 0 | 1 | 1 | 1 | φ | 0 | 0 | ...F1 | \| |
| 0 | 0 | φ | 1 | 1 | 1 | 0 | 0 | 0 | | |
| 0 | 1 | 0 | 0 | 1 | 0 | 0 | 1 | φ | ...F2 | — |
| φ | 1 | 0 | 0 | 1 | 0 | 0 | 1 | 0 | | |
| 0 | 0 | 1 | 0 | 1 | 0 | 1 | φ | 0 | ...F3 | / |
| 0 | φ | 1 | 0 | 1 | 0 | 1 | 0 | 0 | | |
| 1 | 0 | 0 | φ | 1 | 0 | 0 | 0 | 1 | ...F4 | \ |
| 1 | 0 | 0 | 0 | 1 | φ | 0 | 0 | 1 | | |
| 1 | 0 | 1 | 0 | 1 | 0 | 1 | 0 | 1 | ...F5 | X |
| 1 | 0 | 0 | φ | 1 | 0 | 0 | 0 | 0 | ...F6 | ↘ |
| φ | 1 | 0 | 0 | 1 | 0 | 0 | 0 | 0 | ...F7 | → |
| 0 | φ | 1 | 0 | 1 | 0 | 0 | 0 | 0 | ...F8 | ↗ |
| 0 | 0 | φ | 0 | 1 | 1 | 0 | 0 | 0 | ...F9 | ↑ |
| 0 | 0 | 0 | 0 | 1 | φ | 0 | 0 | 1 | ...F10 | ↘ |
| 0 | 0 | 0 | 0 | 1 | 0 | 0 | 1 | φ | ...F11 | ← |
| 0 | 0 | 0 | 0 | 1 | 0 | 1 | φ | 0 | ...F12 | ↙ |
| 0 | 0 | 0 | 1 | 1 | 0 | φ | 0 | 0 | ...F13 | ↓ |
| 0 | 0 | 0 | 0 | 1 | 0 | 0 | 0 | 0 | ...F14 | • |
| 1 | 1 | 1 | 0 | 0 | 1 | 0 | 0 | 1 | ...F15 | L |
| 1 | 1 | 1 | 1 | 0 | 0 | 1 | 0 | 0 | ...F16 | ⌐ |
| 0 | 0 | 1 | 0 | 0 | 1 | 1 | 1 | 1 | ...F17 | ⌟ |
| 1 | 0 | 0 | 1 | 0 | 0 | 1 | 1 | 1 | ...F18 | ⌝ |
| 0 | 1 | 0 | 0 | 1 | 0 | 1 | 1 | 1 | ...F19 | ⊥ |
| 1 | 0 | 0 | 1 | 1 | 1 | 0 | 0 | 0 | ...F20 | ⊤ |
| 0 | 0 | 1 | 1 | 1 | 1 | 0 | 0 | 1 | ...F21 | ⊥ |

Table 1-continued

| | | | If A equals | | | | | | Set Features | |
|---|---|---|---|---|---|---|---|---|---|---|
| g1 | g2 | g3 | g4 | g5 | g6 | g7 | g8 | g9 | F | Representing |
| 1 | 1 | 1 | 0 | 1 | 0 | 0 | 1 | 0 | ...F$_{22}$ | ⊢ | where $\phi$ stands for either 0 or 1.

All other combinations for $g_1, g_2, \ldots, g_9$ will result in no feature being determined. It can be seen from Table 1 that the various combinations of $g_1, g_2, \ldots, g_9$ represents a unique coded value for each geometrical stroke feature, $F_0, F_1 \ldots, F_{22}$.

It can be seen from FIG. 10 that the G circuit performs the logical function of generating an output "1" only if two or more of the inputs $I_1, I_2, I_3, I_4$ are from areas in MA5 which contain a black element (logical "1"), else the output is zero. Each G circuit, $G_1, G_2, \ldots, G_9$, has its input lines connected to the blocks I, II, . . ., IX, respectively, shown in FIG. 9a. Each of the nine G circuits will produce either a "1" or "0" on its corresponding output line $g_1, g_2, \ldots, g_9$ during each machine cycle. Thus, a series of "1's" and "0's" will be presented to logic circuit 111 while a matrixed character circulates through SSR6 and through MA5. Circuit 111 comprises a plurality of multiple input, single output AND gates arranged in a combinational array corresponding with the Boolean analysis feature extraction scheme shown in Table 1. During each machine-clocked cycle, logic circuit 111 samples lines $g_1, g_2, \ldots, g_9$ and stores the combination of "1's" and "0's" detected. If a combination of "1's" and "0's" corresponds to one of those shown in Table 1, then an output signal will be generated along one of the corresponding feature lines $F_0, F_1, \ldots, F_{22}$.

Thus it can be seen that feature extraction circuit 11 acts to detect a basic geometrical arrangement of black and white points in the nine blocks I, II, ..., IX, which make up MA5. A series of "1's" and "0's" corresponding to the presence of black and white elements in each of the nine blocks is detected by logic circuit 111. The series of "1's" and "0's" so detected are compared by means of the hardwired combinational network 11 which corresponds to a set of predetermined geometrical stroke features, and an output signal or feature code is generated along one of the output lines $F_0, F_1, \ldots, F_{22}$, if one of these stroke features is detected.

Figure 11:
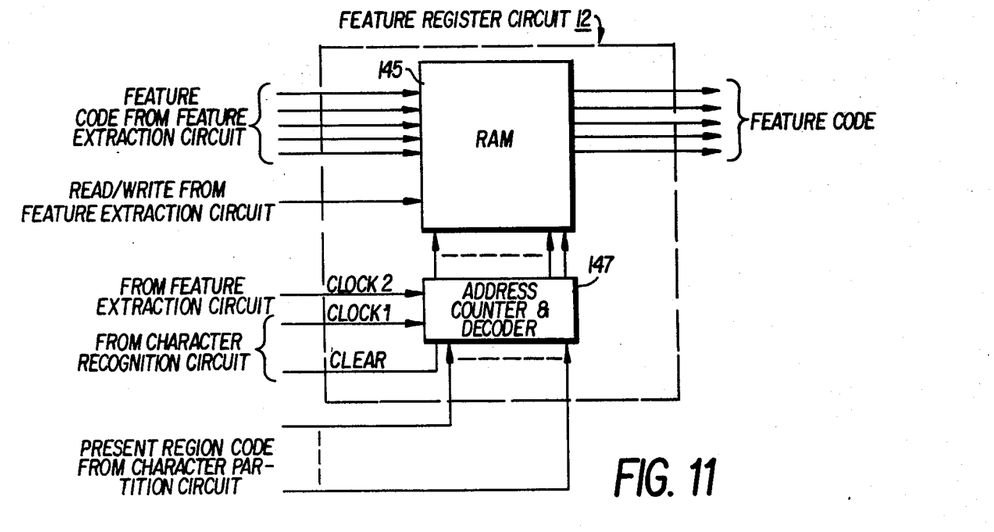
FIG. 11 is a diagram of the feature register circuit shown in FIG. 1.

The code for the feature so extracted will be applied to the input of feature register circuit 12, shown in more detail in FIG. 11. As previously noted, feature register circuit 12 also receives an input from the character partition circuit 10. The inputs from character partition circuit 10 and feature extraction circuit 11 are combined within feature register circuit 12 so as to assign the extracted feature code to the particular character region (such as 113 shown in FIG. 12g) containing the center portions (element 4c) of the particular subregion which was scanned.

Feature register circuit 12 comprises a random access memory 145 having a plurality of inputs $F_1, F_2, \ldots, F_{22}$ from the correspondingly labeled outputs of feature extraction circuit 11. RAM 145 is addressable by address counter and decoder 147. Both RAM 145 and address counter 147 are types well-known in the art. Address counter 147 has two clocked inputs, one from timing circuit 8 and the other from character recognition circuits 13, a CLEAR input from character recognition circuits 13 for clearing the counter 147 between feature extraction steps, and a plurality of inputs from the present region code output lines of partition circuit 10. The output feature code of RAM 145 is applied to the character recognition circuits 13, discussed below.

The features extracted from matrix MA5 by circuit 11 and outputted by feature register circuit 12 will be used to identify the character which the matrix represents. The feature codes outputted by feature register circuit 12 are applied to the inputs of character recognition circuits 13. Character recognition circuits 13 may be of a wide variety among those known to those skilled in the character recognition art. A general purpose digital computer may be used to implement various well-known schemes and weighting algorithms for analyzing the combination feature codes detected for each scanned character and generating a visual or printed indication of the character so detected. For example, in one embodiment the sequence of stroke features detected for regions of the character matrix is compared with a table of sequences corresponding to previously identified characters. The matrix is assigned to the character whose stroke sequences most closely match those of the matrixed character. Alternatively, a weighted value may be assigned to each of the possible stroke features in each region for every possible character, based on the relative importance of that feature to the character in that region, as determined by analysis of previously identified samples of the particular handprinted or machine-printed characters. The matrixed character is identified by summing the weighted values of the detected features assigned to each region to produce a score for each character matrix. The matrix is then assigned to the character yielding the highest score. Additionally, for most machine-printed characters, lines of definite slopes appear in well defined positions within the extent of the characters. The presence or absence of the lines can be easily detected in the thinned character matrix. Based on this information, a recognition rule could be defined to identify machine-printed characters.

Alternately, the outputs of both the character partition and feature extraction circuits are directly applied to the character recognition circuit without having the feature register circuit in the system.

It will be appreciated by those skilled in the art that the foregoing pre-processing, feature extraction and character recognition techniques, though discussed with respect to particular hardwired circuitry shown in the drawing figures, may be easily practiced by performing the various steps through the use of appropriate software used in conjunction with a general purpose digital computer.

While the pre-processing and feature extraction system for character recognition has been described in considerable detail, it is understood that various modifications and changes may occur to persons of ordinary skill in the art without departing from the spirit and scope of the invention as defined in the appended claims.

What is claimed is:

1. Apparatus for machine recognition of hand-written or machine printed characters comprising:
   means for scanning said character;
   means for generating a matrix of black and white points from said scanned character, said matrix being stored in a storage shift register;

means for non-iteratively thinning said matrixed character to generate a centerline representative of said matrixed character;

means for removing isolated points in said thinned character matrix;

means for filling in discontinuities appearing in said centerline of said matrixed character;

means for removing spurious points adjoining said centerline of said matrixed character;

means for partitioning said thinned character matrix into a plurality of regions;

means for scanning a plurality of areas of said regions, each of said areas comprising a plurality of subregions, wherein said scanned areas overlap a plurality of said regions and wherein said areas each have a center point;

means for detecting a pattern of black and white points in each of said scanned areas;

means for generating a unique coded value representative of said detected pattern in each of said scanned areas;

means for comparing said coded value with a known set of values corresponding to geometrical stroke features until a match is detected;

means for generating an output signal indicative of the detection of one of said stroke features, in each of said scanned areas;

means for assigning said detected stroke feature to said area containing said center element of each of said scanned areas;

means for detecting sequentially said assigned stroke features for each of said plurality of regions;

means for comparing said sequentially detected stroke features with a known set of sequences corresponding to characters previously identified; and means for assigning said matrixed character to said previously identified character having stroke sequences most closely corresponding to those detected form said matrixed character.

2. The apparatus of claim 1 wherein said means for thinning said matrixed character to generate a centerline comprises a non-iterative line-thinning circuit, said circuit including:

means for scanning elemental areas of said matrixed characters, said elemental areas each having a center element;

means for detecting a pattern of black and white points in each of said elemental areas; and means for setting said center element in each of said elemental areas to black if a plurality of surrounding elements are also black.

3. The apparatus of claim 2 wherein said elemental areas each comprise a 7×7 element array.

4. The apparatus of claim 1 wherein said means for removing isolated points in said character matrix comprises a noise removal circuit, said circuit including:

means for scanning elemental areas of said matrixed character, said elemental areas each having a center element;

means for detecting a pattern of black and white points in each of said elemental areas; and means for setting said center element in each of said elemental areas to white if all surrounding elements are also white.

5. The apparatus of claim 4 wherein said elemental areas each comprise a 3×3 element array.

6. The apparatus of claim 1 wherein said means for filling in discontinuities appearing in said center of line in said matrixed character comprises a connectivity circuit, said circuit including:

means for scanning elemental areas of said matrixed character, said elemental areas each having a center zone comprising a plurality of points;

means for detecting a pattern of black and white points in each of said elemental areas; and means for setting said central zone in each of said elemental areas to black if a plurality of surrounding elements are also black.

7. The apparatus of claim 6 wherein said elemental areas each comprise a 3×5 element array.

8. The apparatus of claim 1 wherein said means for removing spurious points adjoining said centerline of said matrixed character comprises an edge smoothing circuit, said circuit including:

means for scanning elemental areas of said matrixed character, said elemental areas each having a central section comprising a rectangular array of a plurality of points;

means for detecting a pattern on black and white points adjoining said central section in each of said elemental areas; and means for setting said central section in each of said elemental areas to white if said central section is surrounded on at least three sides by white points.

9. The apparatus of claim 8 wherein said elemental areas each comprise a 6×6 element array.

10. The apparatus of claim 8 wherein said central sections each comprise a 2×2 element array.

11. The apparatus of claim 1 wherein each of said scanned areas comprise a 6×6 element array.

12. The apparatus of claim 11 wherein each said subregion of said scanned areas comprise a 2×2 element array.

* * * * *